(12) United States Patent
Arnold

(10) Patent No.: US 6,169,125 B1
(45) Date of Patent: Jan. 2, 2001

(54) ELECTRICALLY CONDUCTIVE RESINOUS MATERIAL AND RADIATION CURABLE FORMULATION FOR PRODUCING THE SAME

(75) Inventor: John R. Arnold, Harwinton, CT (US)

(73) Assignee: Dymax Corporation, Torrington, CT (US)

(*) Notice: Under 35 U.S.C. 154(b), the term of this patent shall be extended for 0 days.

(21) Appl. No.: 09/228,311

(22) Filed: Jan. 11, 1999

(51) Int. Cl.$^7$ .................................. C08F 2/46; C08F 2/48
(52) U.S. Cl. ......................... 522/71; 522/81; 522/150; 522/153; 522/182; 524/907; 524/780; 524/781; 524/785; 524/786; 524/776; 524/779
(58) Field of Search .................... 522/71, 81, 150, 522/153, 182; 524/907, 780, 781, 785, 786, 776, 779; C08J 5/09; C08K 3/00, 3/08, 3/16

(56) References Cited

U.S. PATENT DOCUMENTS

| | | | |
|---|---|---|---|
| 3,968,056 | * | 7/1976 | Bolon et al. ........................ 252/514 |
| 4,088,801 | * | 5/1978 | Bolon et al. ........................ 427/510 |
| 4,606,962 | * | 8/1986 | Reylek et al. ...................... 428/148 |
| 4,725,478 | * | 2/1988 | Mathias et al. ..................... 428/207 |
| 4,759,970 | * | 7/1988 | Seeger, Jr. et al. ................. 428/209 |
| 4,946,613 | * | 8/1990 | Ishikawa ........................... 252/62.52 |
| 4,999,136 | * | 3/1991 | Su et al. ........................... 252/512 |
| 5,183,593 | * | 2/1993 | Durand et al. ...................... 252/514 |
| 5,254,633 | * | 10/1993 | Han et al. ........................ 525/213.34 |
| 5,328,756 | * | 7/1994 | Wright et al. ...................... 428/220 |
| 5,514,729 | * | 5/1996 | Diamant et al. ..................... 522/81 |
| 5,744,285 | * | 4/1998 | Felten et al. ...................... 430/318 |
| 5,851,644 | * | 12/1998 | McArdle et al. . | |

* cited by examiner

*Primary Examiner*—James J. Seidleck
*Assistant Examiner*—Sanza McClendon
(74) *Attorney, Agent, or Firm*—Ira S. Dorman

(57) ABSTRACT

A radiation-curable formulation employs an electrically conductive filler comprised of elements of elongate form, which elements have surfaces that reflect the actinic radiation to which the photoinitiator employed is responsive. Silver-coated cylindrical fibers or rods will typically constitute the conductive filler, and solid deposits cured from the formulation may function as, for example, sealing elements, gaskets, and solder-like joints. In certain preferred embodiments the formulation will include an active oxygen free radical-generating catalyst, the presence of which enhances curing even though the reaction conditions are such that normal thermal catalysis temperatures are not attained.

46 Claims, 2 Drawing Sheets

ELECTRICALLY CONDUCTIVE RESINOUS MATERIAL AND RADIATION CURABLE FORMULATION FOR PRODUCING THE SAME

BACKGROUND OF THE INVENTION

Metal-filled electrically conductive synthetic resinous materials are well known in the art. For example, Frentzel et al. U.S. Pat. No. 5,395,876 provides a surface mount conductive acrylate adhesive composition that includes about 72 to about 92 parts by weight of finely divided silver particles, typically in the form of flakes having an average particle size of about 0.1 to about 10 microns and a surface area of approximately 0.8 to 1.4 square meters per gram. The adhesives may also include 0.05 to 20 parts by weight of an optional conductive filler, such as powders and flakes of other metals, graphite, and carbon black.

Formulations that cure under ultraviolet irradiation, to produce electrically conductive adhesives, have been commercially available for many years. Electrical conductivity is imparted by adding to the adhesive formulation balls or flakes that are made of, or are coated with, a metal, usually silver. Consistent with the disclosure of Frentzel et al., a high loading of the filler is necessary in such products to provide the mutual contact of the filler elements that is required for conductivity. Moreover, reflectance from the metal surfaces of the filler precludes substantive penetration of the actinic radiation into the polymerizable mass, typically limiting cure to a relatively shallow layer at the exposed surface; efforts to cure such resins to greater depths have conventionally relied upon the incorporation of thermal catalysts or other means for providing a secondary cure mechanism.

It is known that increased depths of cure can be realized by incorporating relatively transparent semiconducting additives into resinous formulations. The resultant cured deposits exhibit relatively poor conductivity, however, typically having a resistance well in excess of 1,000 ohms, whereas much higher values of conductivity (resistances in the range 0.001 to less than 1,000 ohms) are desired.

U.S. Pat. No. 4,113,981, to Fujita et al., provides an electrically conductive adhesive that comprises electrically conductive particles mixed in a non-conductive base at such a mixing ratio that the conductive particles are not in contact with on another. When the adhesive is disposed between facing electrodes it provides electrical conductivity between the electrodes but maintains electrical insulation in the lateral direction.

U.S. Pat. No. 4,554,033, to Dery et al., provides interconnecting means comprised of a conductive ink element printed upon a first substrate, the conductive ink being comprised of an insulating polymer medium having first and second groups of conductive particles therein, and an insulating layer of flowable adhesive in covering relationship to the conductors. The particles of first group are finely divided and are suspended in the medium to form a continuous conductive path along the length of the conductor. The second group of particles are agglomerates of large particles, which are randomly scattered throughout the conductive path and project above the surface of the medium. Interconnection is effected by positioning the first substrate conductors in an overlapping conducting relationship to the conductors on the second substrate, such that the flowable adhesive is disposed between the two substrates, and applying pressure to the positioned conductors and surrounding areas. The adhesive flows and exposes the protruding agglomerates, thus bringing the agglomerates into contact and electrical interconnection with the conductors while also causing the adhesive to bond the substrates to one another.

U.S. Pat. No. 4,595,604, to Martin et al., provides conductive compositions that are solderable and flexible and that can be bonded directly to substrates. The compositions are made up of a combination of silver, exclusively in the form of flake, and a resin system comprised of vinyl chloride/vinyl acetate copolymer, epoxy resin, and epoxy hardener.

In accordance with Tsukagoshi et al. U.S. Pat. No. 4,740,657, connection of conductors can be accomplished by using an adhesive composition or film capable of exhibiting anisotropic-electroconductivity, the electroconductive particles comprising polymeric core materials coated with thin metal layers; the composition includes an electrically insulating adhesive component.

U.S. Pat. No. 4,959,178, to Frentzel et al., provides an actinic radiation curable polymer thick film composition comprising, by weight: (a) about 10 to about 20 parts of an unsaturated monomer capable of being polymerized by actinic radiation; (b) about 2.5 to about 8 parts of at least one thermoplastic polymer having a glass transition value of above about 100° F. and not being capable of substantial cross-linking with monomer (a), polymer (b) being dissolved in monomer (a); (c) about 68 to about 85 parts of conductive metal particles; and (d) about 0.1 to about 5 parts of at least one actinic radiation polymerization initiator.

In the electrode arrangement described in Mose U.S. Pat. No. 5,235,741, first and second substrates are bonded together using a UV light curable adhesive. The adhesive carries first and second dispersed particles; the first particles are conductive, and preferably resilient, and function to form current paths between electrodes on the second substrates, while the second particles function to prevent excess deformation of the first particles.

SUMMARY OF THE INVENTION

Broad objects of the present invention are to provide a novel radiation-curable formulation for producing a solid deposit, a novel method for producing such a deposit on a substrate, and the novel article so produced, whereby and wherein an increased depth and completeness of curing can be achieved, as compared to similar conventional formulations, methods, and articles.

More specific objects of the invention are to provide such a formulation, method, and article wherein and whereby electrical conductivity is imparted to the cured deposit, and wherein and whereby the cured deposit is of high quality and of substantially wrinkle-free surface character.

It has now been found that certain of the foregoing and related objects of the invention are attained by the provision of a radiation-curable formulation for producing an electrically conductive solid deposit, which formulation comprises a radiation-curable composition containing at least one polymerizable ingredient and a photoinitiator for effecting polymerization of the ingredient; and an electrically conductive filler dispersed in the composition in an amount sufficient to impart substantial electrical conductivity to a cured deposit of the formulation. The electrically conductive filler employed is comprised of elements of elongate form having surfaces that reflect substantially at least one wavelength of actinic radiation to which the photoinitiator is responsive. The polymerizable composition will typically be one that cures by a free radical mechanism, and for maximum effectiveness and efficiency it will usually be most advantageous to employ a photoinitiator (or a combination of photoinitiators) that affords response to wavelengths of actinic radiation in both the ultraviolet and also the visible spectral regions.

The elongate filler elements may themselves be metallic; usually however they will comprise a core of a dielectric material, such as glass, plastic, or nonmetallic mineral, coated with a metallic material. Although silver will generally be employed, other suitable metals (such as gold, platinum, copper, aluminum, lithium, nickel, chrome, iron, and mixtures and alloys thereof) may be substituted if so desired. The elongate filler elements will preferably be of generally cylindrical form, most desirably comprising chopped filaments of various lengths, and will as a practical matter usually comprise about 20 to 80 percent of the volume of the formulation; in preferred embodiments the conductive filer will comprise about 30 to 70 percent of the formulation and, most desirably, it will comprise about 40 to 60 percent thereof.

The formulation will desirably include a material that imparts thixotropic properties, and thereby stabilizes the homogeneity of the formulation. In preferred embodiments the formulation will additionally include an active oxygen free radical-generating catalyst (i.e., a compound containing the peroxy group, which will normally be subject to thermal activation), e.g., a perester such a t-butyl perbenzoate and t-butyl peroctoate or a hydroperoxide such as cumene hydroperoxide.

Other objects of the invention are attained by the provision of a method for producing an electrically conductive solid deposit. A mass of a radiation-curable formulation, composed as herein set forth, is applied to at least one substrate and is exposed to actinic radiation to effect substantial curing, the actinic radiation including the "at least one wavelength of radiation" to which the photoinitiator is responsive. The mass of formulation applied may have a thickness of about 20 mils or more, and substantial curing of the formulation can be achieved, in the irradiation step, throughout the full depth of such a deposit; increased depth of curing is promoted by the active oxygen.

Additional objects of the invention are attained by the provision of an article of manufacture comprised of at least one substrate carrying a solid deposit made from the formulation described, the article generally being produced by the method set forth. The mass of formulation may be applied to two adjacent surfaces, with the cured, solid deposit forming a seal therebetween; alternatively, using a composition that is composed to cure to a compressible, adhesive solid, the formulation mass may be applied in such a configuration as to function as a gasket; as another example the formulation mass may be applied to two conductive elements so as to function as a solder joint between them.

DETAILED DESCRIPTION OF THE ILLUSTRATED AND PREFERRED EMBODIMENTS

Figure 1:
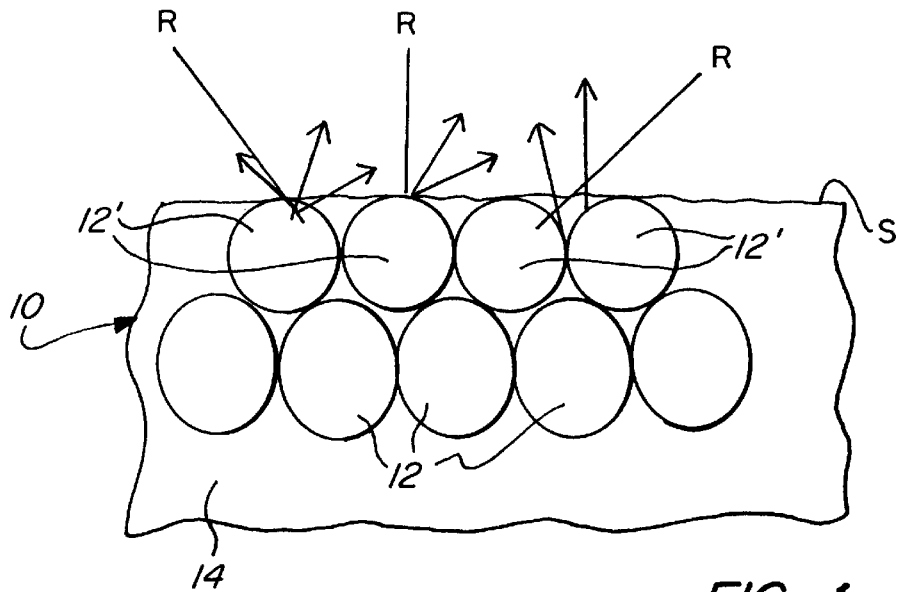
FIGS. 1 and 2 are diagrammatic, fragmentary views, each showing a section of a mass of a polymerizable formulation containing conductive elements and representing the prior art.

Turning initially to FIG. 1 of the drawings, therein illustrated is a mass, generally designated by the numeral 10, comprised of spherical elements 12 admixed in a radiation-curable polymerizable formulation 14 and including a top layer of elements 12'. The spherical elements 12 comprise an electrically conductive metal surface, and are in substantial mutual contact with one another to impart electrical conductivity to the mass 10 (and to the cured resin that is produced upon polymerization). The Figure shows rays R of radiation impinging upon the upper surface S of the mass, the radiation beam including at least one wavelength to which the photoinitiator employed responds for the initiation of polymerization. As can be seen, the spherical elements 12' that lie near the surface of the mass reflect the radiation and thereby effectively block its penetration, thus inhibiting the initiation of polymerization beneath a relatively shallow surface layer.

Figure 2:
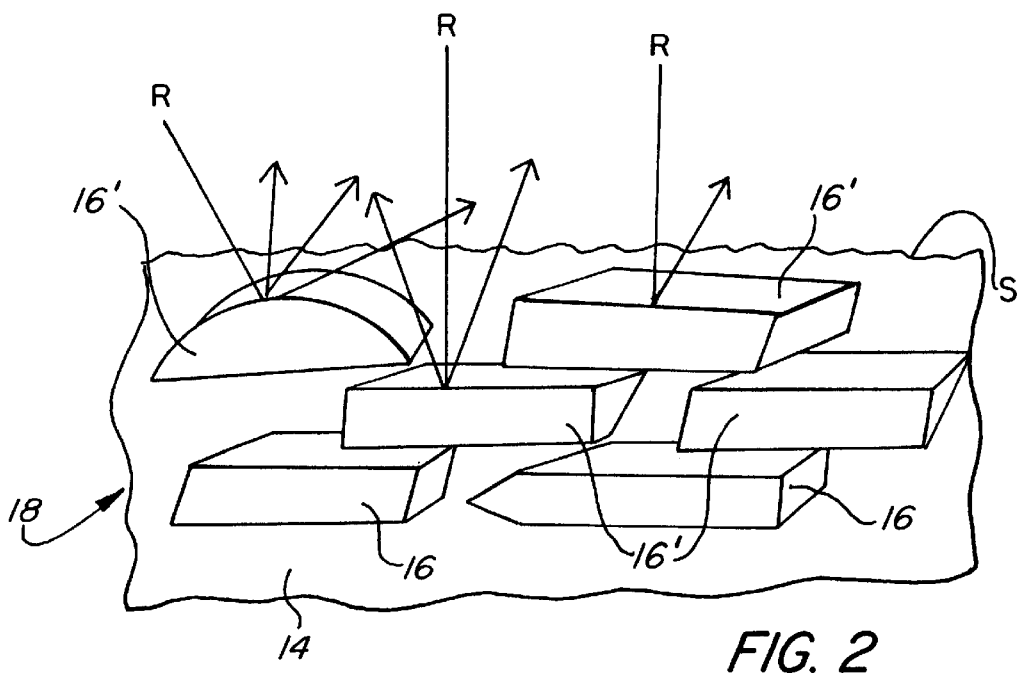

FIG. 2 of the drawings is similar to FIG. 1 but depicts a mass of polymerizable formulation, generally designated by the numeral 18, containing reflective filler elements 16 of flake, or plate-like, form. Here again the elements 16' of the upper layer effectively block penetration of the radiation rays R and thereby substantially preclude curing within the depth of the mass 18.

Figure 3:
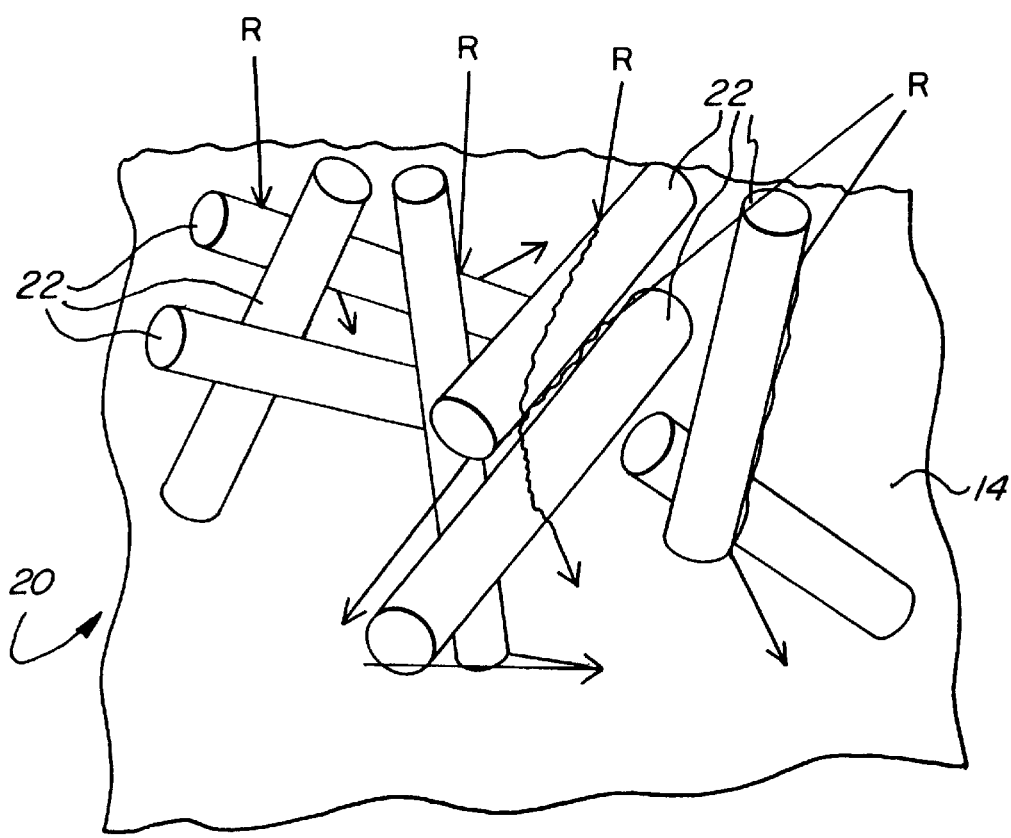
FIG. 3 is a diagrammatic, fragmentary view showing a section of a mass of polymerizable material embodying the present invention, containing elongate reflective and electrically conductive filler elements.

FIG. 3 shows a formulation mass, generally designated by the numeral 20, in which the filler elements 22 are of chopped cylindrical filament, or rod-like, form, and have reflective, electrically conductive surfaces; they are randomly oriented in the polymerizable composition 14 and contact one another at points along their lengths. Not only will the elements 22 thereby impart electrical conductivity to a cured deposit, but they will also reflect the impinging rays R along multiple paths through the mass 20 (including paths having downward components), and will thereby promote penetration of the actinic radiation so as to produce a significantly increased depth of cure.

Illustrative of the efficacy of the present invention are the following examples. In all instances the single or (if two) the primary filler employed is constituted of cylindrical filaments of boro-silicate glass, about 10 to 15 microns in diameter and of various lengths ranging from about 50 to 75 microns, coated to a thickness of about 750 Å with silver to provide about 8 to 9 percent by weight of the metal; the material is available from Potters Industries, Inc. under the trademark CONDUCT-O-FIL (SF82TF8). The UV photoinitiator employed was 1-hydroxyl cyclohexyl phenyl ketone, and the UV/visible photoinitiator was a 25 percent solution of bis(2,6-dimethoxybenzoyl)-2,4,4-trimethylpentyl phosphine oxide (BAPO) in a conventional liquid photoinitiator (DAROCUR 1173), the photoinitiators being sold under the designations IRGACURE 184 and CGI 1700, respectively, and both being available from the Ciba Geigy Company. It is to be appreciated that the DAROCUR 1173 component of CGI 1700 is utilized essentially for solubilizing the BAPO, which could instead be introduced in a different solvent without diminishing the effectiveness of the phosphine oxide initiator and without significantly affecting the results obtained in any example presented herein.

EXAMPLE ONE

A polymerizable composition was prepared by admixing the following ingredients, in the parts by weight specified:

| | |
|---|---|
| Urethane (meth)acrylate reactive oligomer | 61.0 |
| n-Vinyl pyrrolidone | 17.7 |
| Isobornyl acrylate | 17.7 |
| UV Photoinitiator (IRGACURE 184) | 3.5 |
| Polymerization stabilizer | 0.1 |

To this composition were added the UV/visible light responsive photoinitiator (CGI 1700), and a weighed quantity of either the electrically conductive fibers (CONDUCT-O-FIL SF82TF8), silver flakes (available from Chemet Corporation), or silver-coated spheres. Quantities of the resulting formulations were coated upon glass coupons to a thickness of about 5 mils, and were cured for 50 to 60 seconds using a lamp rated at 100 mW/cm² and emitting both UV and visible wavelengths. The surface of each coating was then tested for electrical conductivity, using an ohmmeter, and the deposit was inspected for subsurface cure (as indicated by its surface quality).

Table One, which follows, identifies the specific resin formulations (in parts by weight) employed in Example One, and the properties exhibited by the cured deposit produced from each:

TABLE ONE

| Formulation: | A | B | C | D |
|---|---|---|---|---|
| Polymerizable Composition | 10 | 10 | 10 | 10 |
| CGI 1700 | 0.5 | 0.5 | 0.5 | 0.3 |
| CONDUCT-O-FIL | 12 | | | |
| Silver Flake (325 mesh) | | 12 | | |
| Silver Flake (400 mesh) | | | 12 | |
| Silver-coated Spheres (42 μm) | | | | 12 |
| Resistance (ohms) | 13–400 | 800–3 M | 150–15 k | >20 M |
| Subsurface cure | good | poor | poor | poor |
| Color | gold | silver | silver | brown |
| Separation | some | some | some | large |

As can be seen, the filamentous filer yielded the lowest electrical resistance; i.e., the best conductivity. (Single values, and the lower of any two values set forth, were obtained with heavy force on the probe; the higher of two values reported was obtained with light probe force. While the light probe-force data are somewhat subjective, the heavy probe-force values do define fairly objective limits.) The visual observations made establish moreover that the rod-shaped filler produces a highly advantageous depth of cure. That is evidenced by the presence of flat surfaces, substantially devoid of wrinkles; the surfaces of the coatings that were produced from formulations filled with spheres and flakes were, on the other hand, characterized by a high degree of wrinkling. As is known to those skilled in the art, wrinkles form when portions of a deposit cure at different rates or to different extents, and are generally indicative of the presence of uncured subsurface material.

EXAMPLE TWO

A second polymerizable composition was prepared by admixing the following ingredients (certain of which are more specifically described above) in the parts by weight specified:

| | |
|---|---|
| Urethane (meth)acrylate reactive oligomer | 70.0 |
| n-Vinyl pyrrolidone | 12.7 |
| Isobornyl acrylate | 12.7 |
| UV Photoinitiator | 2.5 |
| UV/Visible photoinitiator | 2.0 |
| Polymerization stabilizer | 0.1 |

A series of formulations were prepared by admixing the CONDUCT-O-FIL electrically conductive filler product with the foregoing composition, in various proportions. Using a draw-down bar, a 20 mil-thick layer of each formulation was produced on MYLAR film. The deposits were cured on a conveyor moving at three feet per minute, thereby exposing them for about 1.7 seconds to a 2000 mW/cm² beam containing wavelengths of UV and visible radiation to which the photoinitiators employed were responsive. The surface resistance of each cured coating was measured across a one centimeter gap.

As shown in Table Two which follows (and in which the amounts of ingredients are expressed in percentages by weight), conductivity increases as the filler:resin ratio increases, until the formulation contains 60 percent of the filler. With the exception of formulation L, which exhibited a lumpy surface, all of the films produced were smooth and wrinkle-free, and were cured throughout.

TABLE TWO

| Formulation | E | F | G | H | I | J | K | L |
|---|---|---|---|---|---|---|---|---|
| Polymerizable Composition | 100 | 70 | 60 | 55 | 50 | 45 | 40 | 30 |
| CONDUCT-O-FIL | | 30 | 40 | 45 | 50 | 55 | 60 | 70 |
| Resistance (ohms) | $1 \times 10^{12}$ | $>2 \times 10^7$ | $>2 \times 10^7$ | 9 | 2.2 | 0.9 | 0.7 | 1.5 |

EXAMPLE THREE

A series of formulations were prepared using the polymerizable composition of Example Two, to which was added various amounts of the CONDUCT-O-FIL product, as a primary filler, and, as secondary fillers, various amounts of particles of indium oxide ($In_2O_3$) and tin oxide ($SnO_2$), alone and combined in a 90:10 indium oxide:tin oxide weight ratio (the mixture being refereed to as ITO). The quantities of ingredients (expressed in percentages by weight), and the properties of 20-mil coatings cured as described in the foregoing Example, are set forth below in Table Three. The letters "S" and "W" designate, respectively, a smooth surface and a slightly wrinkled surface appearance on the cured coating; "W⁺" indicates a higher degree of wrinkling than "W". To obtain the separation values reported, a tube of the formulation was allowed to settle for two weeks' time, after which the depth of the upper liquid phase was measured and expressed as a percentage of the total depth of the column.

TABLE THREE

| Formulation: | M | N | O | P | Q | R | S | T | U |
|---|---|---|---|---|---|---|---|---|---|
| Polymerizable Composition | 50.0 | 50.0 | 50.0 | 50.0 | 50.0 | 50.0 | 50.0 | 50.0 | 50.0 |
| CONDUCT-O- FIL | 50.0 | 47.5 | 45.0 | 40.0 | 49.0 | 45.0 | 40.0 | 45.0 | 40.0 |
| ITO | | 2.5 | 5.0 | 10.0 | | | | | |
| $SnO_2$ | | | | | 1.0 | 5.0 | 10.0 | | |
| $In_2O_3$ | | | | | | | | 5.0 | 10.0 |
| Resistance (ohms) | 2.2 | 11 | 7 | 6.8 | 4.5 | 6.1 | 80 | 31 | 120 |
| Appearance | S | S | S | W | S | W | W+ | W | W |
| Separation | 26.1 | 34.8 | 22.2 | 11.1 | 21.1 | 2.6 | 0.0 | 18.9 | 14.3 |

As can be seen from the foregoing data, the addition of small amounts (by which is generally meant not more than about 20 percent by weight) of a UV- or visible-light transparent, semiconducting thixotrope, in combination with the primary filler, produces a highly beneficial effect upon separation, albeit with a small decrease in the depth of cure and a small sacrifice in conductivity (as compared to the results obtained using the primary filler alone). Because the tin oxide particles were relatively large, a high degree of homogeneity could be maintained at a concentration of only five percent; clumping of the tin oxide particles lead however to a reduced depth of cure, as compared to that which was obtained with the other semiconducting additives. The optimum amount of secondary filler employed appears to bear a direct relationship to the amount of the polymerizable composition contained in the formulation; when used, the secondary filler will generally constitute 10 to 50 percent of the total weight of the primary and secondary fillers incorporated. Not surprisingly, conductivity is found to correlate to the primary filler:polymerizable composition ratio.

EXAMPLE FOUR

A third polymerizable composition was prepared by admixing the following ingredients, in the parts by weight specified:

| | |
|---|---|
| (Meth)acrylate isoprene oligomer | 20.0 |
| Stearyl acrylate | 6.0 |
| Vinyl caprolactam | 6.0 |
| UV/visible photoinitiator | 0.5 |
| Acrylic acid | 0.7 |
| Organic thixotropic thickener | 0.5 |

Three formulations were prepared from this composition, as defined in Table Four below (wherein the ingredients are again expressed in parts by weight):

TABLE FOUR

| Formulation: | V | W | X | Temperature ° C. |
|---|---|---|---|---|
| Polymerizable Composition | 35 | 35 | 35 | |
| CONDUCT-O-FIL | 65 | 65 | 65 | |
| t-Butyl Peroctoate | | 0.8 | | |
| t-Butyl Perbenzoate | | | 0.8 | |
| 5 sec/4000 mW/cm$^2$ | 7 | 40 | 40 | 62 |
| 45 sec/150 mW/cm$^2$ | 6 | 19 | 20 | 93 |
| 1 hr/70° C. | none | none | none | 70 |
| 1 hr/90° C. | none | thickened | none | 90 |
| 1 hr/110° C. | none | thickened | thickened | 110 |
| 1 hr/150° C. | gelled | 40 | 40 | 150 |

The data in Table Four indicates the depth (in mils) to which each of the formulations, deposited as a bead 40 mils thick, cured when subjected to the curing conditions specified: i.e., 5 seconds exposure to a Fusion D bulb, providing a UV intensity of 4000 mW/cm$^2$ at 365 nm; 45 seconds exposure to a Dymax 5000-EC bulb, providing a UV intensity of 150 mW/cm$^2$ at 365 nm; or oven heating, for one hour, at 70° C., 90° C., 110° C. or 150° C. An infrared sensor was used to measure the bead temperatures (shown in the column headed "Temperature °C."), taken within one second after removal of the sample from the light source or the oven, as the case may be; an indication that the sample "thickened" refers to the condition of the base of the bead, and the "gelled" notation indicates that the bead achieved a fully gelled condition. The half-life of t-butyl peroctoate is about one hour at 95° C., and the half-life of t-butyl perbenzoate is about one hour at 125° C.; the organic thixotrope used is a commercially available polyamide.

From the date in Table Four, it can be seen that the presence of the active oxygen thermal catalyst greatly increases the depth to which the formulation cures, and that is so despite the failure of the bead to reach a temperature at which the peroxide is substantially activated (as indicated by its one-hour half-life property). The phenomenon that occurs is theorized to be attributable to a cascade effect, in which free radicals from the photoinitiator cause the active oxygen catalyst to in turn produce free radicals, and is distinct from a conventional secondary cure mechanism in which, for example, thermal curing is used to provide an alternate reaction route or to help to take a photoinitiated reaction to completion. When employed, the active oxygen catalyst will typically be incorporated at a concentration of 0.5 to 3.0 percent, based upon the weight of polymerizable ingredients present in the formulation, and it is believed that, for this purpose, other conventional free-radical generating active oxygen initiators are functionally equivalent to the disclosed perester catalysts.

As will be appreciated by those skilled in the art, the broad concepts of the present invention are not limited by or to the use of any particular polymerizable composition or polymerization mechanism, as long as the system is curable by actinic radiation and is compatible with the reflective filler(s) used. It might be noted in this regard that the feasibility of applying the present concepts to a polymerizable composition in which catalysis depends upon or is promoted by a metal ion (or other metal species) may be limited due to a tendency for premature reaction or other instability, caused by a component on the surface of the electrically conducting filler; a filler comprised of a metal that is essentially inert in the system, such as gold or platinum, may however obviate any such problem. Although epoxy, vinyl ester, thiophene, and like systems might be mentioned as alternatives, it will be evident from the Examples given above that the preferred composition will in many instances comprise an acrylate-based, free radical curing system.

Suitable reactive acrylate monomers include both monofunctional and polyfunctional compounds. Such monomers will generally be reaction products of acrylic acid and/or methacrylic acid with one or more mono- or poly-basic, substituted or unsubstituted, alkyl ($C_1$ to $C_{18}$), aryl or aralkyl alcohols. Acrylates in which the alcohol moiety contains a polar substituent (e.g., an hydroxyl, amine, halogen, cyano, heterocyclic or cyclohexyl group) will often be preferred because crosslinking, or other intermolecular bonding, is promoted thereby. Specifics acrylates that might be identified, for use alone or in combination with one another, include the following (it being recognized that the corresponding methacrylate compounds may be preferred in many instances): hydroxyethylacrylate, isobornyl acrylate, tetrahydrofurfuryl acrylate, diethylene-glycoldiacrylate, 1,4-butanedioldiacrylate, butylene stearyl acrylate, glycoldiacrylate, neopentyl glycol diacrylate, octylttrylate and decylacrylate (normally in admixture), polyethyleneglycol diacrylate, trimethylcyclohexyl acrylate, benzyl acrylate, butyleneglycoldiacrylate, polybutyleneglycoldiacrylate, tripropyleneglycoldiacrylate, trimethylolpropanetriacrylate, di-trimethylolpropanetetraacrylate, pentaerythritoltetraacrylate, and di-pentaerytritol pentaacrylate.

About 1 to 10 weight percent of acrylic acid or methacrylic acid will beneficially be employed in such an acrylate formulation, especially to increase adhesion. A tautomeric acid constituent may also contribute to bond strength; although maleic acid is preferred, other acids capable of cyclic tautomerism can also be used, such as malic, salicylic, itaconic, and phthalic. A free-radical reactive oligomer will normally also be included, alone or, where appropriate, in combination with a cationic-reactive oligomer. Oligomers suitable for use are well known in the art, and comprise vinyl polymers, acrylic polymers, polyester elastomers, glycol polymers, acrylated epoxies, natural and synthetic rubbers, polyester acrylates, epoxy acrylates, polyether acrylates, alkyd acrylates, polyol acrylates, and the like. The urethane polymers and prepolymers will often be found most beneficial, with the latter being especially desirable due to the potential they afford for further reaction of their pendant isocyanate groups with a reactive functionality (e.g., an hydroxyl group) provided by a suitable acrylate monomer. Diisocyanate-capped polyethers and polyesters, acrylated by reaction with hydroxyethyl acrylate or hydroxyethyl methacrylate and having a molecular weight of about 400 to 6,000, are particularly preferred.

Although the concepts of the invention are also not dependent upon the use of any particular photoinitiator, those that respond in the ultraviolet and/or visible spectral regions will normally be preferred, as a practical matter. Indeed, because the metal of which the primary conductive filler is comprised will usually be one that reflects visible light more efficiently than UV radiation (a continuous band of which is often absorbed significantly by metals such as silver and copper), photoinitiators that respond to radiation that includes visible wavelengths will often be employed to greatest advantage.

In addition to the compounds identified above, a further listing of conventional photo-initiators that might be utilized herein include dimeoxy-2-phenylacetophenone (IRGACURE 651); 2-benzyl-2-N,N-dimethyl amino-1-(4-morpholinophenyl)-1-butanone (IRGACURE 369); bis($\mu^5$-2,4-cycloypentadien-1-yl)bis[2,6-difluoro-3-(1H-pyrrol-1-yl)phenyl]titanium (IRGACURE784DC); and 2-hydroxy-2-methyl-1-phenyl-propane-1-one (DAROCURE 1173), as well as the photoinitiators disclosed in U.S. Pat. No. 4,820,744, particularly at line 43, column 4, through line 7, column 7. Suitable alternative UV/visible photoinitiators include DAROCUR 4265, which is a 50 percent solution of 2,4,5-trimethyl benzoyl diphenyl-phosphine oxide in DAROCUR 1173, and IRGACURE 819, phoine oxide, phenyl-bis(2,4,6-trimethyl)benzoyl. Cationic photoinitiators represent another class of catalytic agents that can be employed herein, in appropriate circumstances.

Particularly in instances in which the formulation is to be used as a potting compound, it may be especially desirable to incorporate a chain transfer agent of the kind that is typically employed in compositions that are cured by electron beam initiation; e.g., halogen compounds, sulfur compounds, and secondary and tertiary aromatic hydrocarbons such as cumeme, carbon tetrachloride, 1,4-disopropyl benzene, t-butyl benzene, bisphenol A and glycidyl ether derivatives thereof, etc. The use of chain transfer agents may serve to increase the hardness of the resultant polymer, the degree of which will depend to an extent upon the concentration of the agent in the formulation, which will typically be in the range 0.5 to 5.0 weight percent.

Other materials may be incorporated into the instant formulations in addition to the components hereinabove described, to the extent that doing so is consistent with the objects set forth and the foregoing disclosure. For example, "inert" fillers such as wood flour, cornstarch, glass elements, cotton linters, mica, alumina, silica, and the like, may be used to modify viscosity, improve impact resistance, and for other purposes, and small percentages of silane coupling agents may be incorporated to increase moisture resistance as well as to enhance bond strength to glass and similar surfaces. Substances such as dyes, flame retarders, stabilizers (e.g., the quinones and hydroquinones), viscosity modifiers (thixotropes, thickeners, viscosity reducers), plasticizers, antioxidants, and the like, may be incorporated as well.

It should be appreciated that, although a transparent, semiconducting thixotrope is employed in Example Three hereof, the instant invention does not depend upon the thixotrope (when used) having those properties. As is indicated by Example Four the primary function of the thixotrope in the claimed formulation and method is to maintain the homogeneous distribution of the primary filler; transparency to the wavelengths of actinic radiation employed will of course be desirable, however, especially in those instances in which the thixotrope concentration is relatively high.

Although the elongate primary conductive fillers disclosed herein are exemplary, and represent the best mode presently contemplated for carrying out the invention, it will be appreciated that other, functionally equivalent fillers are also deemed to fall within its scope. The invention contemplates the use of elongate fillers of any dimensions and configuration (and mixtures of different such fillers), which can be dispersed randomly in a reactive formulation and which can, by mutual contact, increase electrical conductivity while at the same time reflecting actinic radiation into the mass of a deposit comprising the same.

Indeed, while it is believed that greatest benefit will be derived from the use of electrically conductive elongate fillers, it should nevertheless be appreciated that elongate dielectric or semiconducting fillers may also be found to afford significant advantages in radiation-curable formulations. Such fillers may serve essentially to increase the depth of cure by promoting penetration of actinic radiation, and thus may desirably be incorporated irrespective of whether or not electrical conductivity is also afforded or is substantially enhanced.

Although amounts of ingredients are expressed in the foregoing Examples as parts and percentages by weight, that it is done largely as a matter of convenience; volumetric values will often provide a more meaningful characterization because of the wide variations that exist in the densities of ingredients that are suitable for use herein. For example, whereas silver-coated glass fibers will typically have a density in the range 2.6 to 3.9 g/cc, the densities of lithium fibers and gold fibers will typically be about 0.5 g/cc and 19 g/cc, respectively. The density of the polymerizable composition will also be a variable; generally, it will lie in a range of about 0.95 to 1.1 g/cc, but it may certainly deviate significantly depending upon the particular resin(s) employed, the presence of additives, etc. While therefore the numerical values expressed herein and in the appended claims will provide meaningful guidance to those skilled in the art, they are not to be construed as constituting limitations upon the scope of the invention.

Thus, it can be seen that the present invention provides a novel radiation-curable formulation for producing a solid deposit, as well as a novel method for producing such a deposit on a substrate and the novel article so produced, whereby and wherein increased depth and completion of curing are achieved, as compared to similar conventional formulations, methods, and articles. The cured deposits are of high quality, and they exhibit substantially wrinkle-free surface character as well as enhanced electrical conductivity.

Having thus described the invention, what is claimed is:

1. A radiation-curable formulation for producing an electrically conductive solid deposit, comprising:
   a radiation-curable composition containing at least one polymerizable ingredient, and a photoinitiator for effecting polymerization of said at least one ingredient; and
   an electrically conductive filler dispersed in said composition in an amount sufficient to impart substantial electrical conductivity to a cured deposit of said formulation, said electrically conductive filler being comprised of elements of elongate form having surfaces that reflect substantially at least one wavelength of actinic radiation to which said photoinitiator is responsive, said filler elements being randomly oriented in said composition so as to reflect impinging radiation of said at least one wavelength along multiple paths through a mass of said formulation.

2. The formulation of claim 1 wherein said surfaces of said elongate filler elements comprise a metallic material.

3. The formulation of claim 2 wherein said metallic material comprising said surfaces of said elongate filler elements is a metal selected from the group consisting of gold, silver, platinum, copper, lithium, aluminum, nickel, chrome, iron, and mixtures and alloys thereof; and wherein said at least one wavelength of actinic radiation lies in a band that includes ultraviolet and visible regions.

4. A The formulation of claim 2 wherein said elongate filler elements comprise a core of a dielectric material carrying a coating of a metallic material.

5. The formulation of claim 4 wherein said dielectric core material is selected from the class consisting of glass, plastics, and nonmetallic minerals.

6. The formulation of claim 1 wherein said elongate filler elements are of generally cylindrical form.

7. The formulation of claim 1 wherein said elongate filler elements comprise chopped filaments of various lengths.

8. The formulation of claim 1 wherein said elongate filler elements comprise silver-coated glass filaments.

9. The formulation of claim 1 wherein said electrically conductive filler comprises about 20 to 80 percent of the volume of said formulation.

10. The formulation of claim 9 wherein said electrically conductive filler comprises about 30 to 70 percent of the volume of said formulation.

11. The formulation of claim 9 wherein said electrically conductive filler comprises about 40 to 60 percent of the volume of said formulation.

12. The formulation of claim 1 wherein said photoinitiator is responsive to wavelengths of actinic radiation in both the ultraviolet and also the visible spectral regions.

13. The formulation of claim 1 wherein said filler elements are homogeneously distributed in said formulation, said composition additionally including a component that imparts thixotropic properties to said formulation to better maintain said homogeneous distribution of said filler elements and said random orientation thereof.

14. A method for producing an electrically conductive solid deposit upon a substrate, comprising the steps:
   (a) providing a radiation-curable formulation comprised of (1) a radiation-curable composition containing at least one polymerizable ingredient and a photoinitiator for effecting polymerization of said at least one ingredient; and (2) an electrically conductive filler dispersed in said composition in an amount sufficient to impart substantial electrical conductivity to a cured deposit of said formulation, said electrically conductive filler being comprised of elements of elongate form having surfaces that reflect substantially at least one wavelength of actinic radiation to which said photoinitiator is responsive;
   (b) applying a mass of said formulation to at least one substrate; and
   (c) exposing said mass of said formulation to actinic radiation to effect substantial curing of said formulation to a solid deposit, said actinic radiation to which said mass is exposed including said at least one wavelength of radiation to which said photoinitiator is responsive, said filler elements being randomly oriented in said composition so as to reflect impinging radiation of said at least one wavelength along multiple paths through said mass, including paths by which penetration of said actinic radiation into said mass is promoted.

15. The method of claim 14 wherein said applied mass of formulation has a thickness of at least about 20 mils, and wherein substantial curing of said formulation is effected in said step (c) to a depth, in the thickness direction of said mass, of at least about 20 mils.

16. The method of claim 14 wherein said surfaces of said elongate filler elements comprise a metallic material selected from the group consisting of gold, silver, platinum, copper, lithium, aluminum, nickel, chrome, iron, and mixtures and alloys thereof; and wherein said at least one wavelength of actinic radiation lies in a band that includes ultraviolet and visible regions.

17. The method of claim 16 wherein said elongate filler elements are of generally cylindrical form.

18. The method of claim 17 wherein said elongate filler elements comprise silver-coated glass filaments.

19. The method of claim 14 wherein said electrically conductive filler comprises about 20 to 80 percent of the volume of said formulation.

20. The method of claim 14 wherein said photoinitiator is responsive to wavelengths of actinic radiation in both the ultraviolet and also the visible spectral regions, and wherein said actinic radiation to which said mass is exposed includes at least one frequency of wavelength in each of said ultraviolet and visible spectral regions.

21. As an article of manufacture, the combination of at least one substrate and a mass of the formulation of claim 1 cured on said substrate to a solid deposit.

22. The article of claim 21 wherein said elongate filler elements comprise a metallic material selected from the group consisting of gold, silver, platinum, copper, lithium, aluminum, nickel, chrome, iron, and mixtures and alloys thereof; and wherein said at least one wavelength of actinic radiation lies in a band that includes ultraviolet and visible regions.

23. The article of claim 22 wherein said elongate filler elements are of generally cylindrical form.

24. The article of claim 22 wherein said elongate filler elements comprise silver-coated glass filaments.

25. The article of claim 21 wherein said electrically conductive filler comprises about 20 to 80 percent of the volume of said formulation.

26. The article of claim 21 wherein said photoinitiator is responsive to wavelengths of actinic radiation in both the ultraviolet and also the visible spectral regions.

27. As an article of manufacture, the combination of at least one substrate and a solid deposit made in accordance with the method of claim 14.

28. The method of claim 14, wherein said filler elements are homogeneously distributed in said formulation, said composition additionally including a component that imparts thixotropic properties to said formulation to maintain said homogeneous distribution of said filler elements and said random orientation thereof.

29. The article of claim 21 wherein said filler elements are homogeneously distributed in said formulation, said composition additionally including a component that imparts thixotropic properties to said formulation to maintain said homogeneous distribution of said filler elements and said random orientation thereof.

30. The article of claim 27 wherein said filler elements are homogeneously distributed in said formulation, said composition additionally including a component that imparts thixotropic properties to said formulation to maintain said homogeneous distribution of said filler elements and said random orientation thereof.

31. The formulation of claim 1 wherein polymerization of said at least one polymerizable ingredient is subject to free radical initiation, and wherein said photoinitiator is a free radical generator.

32. The formulation of claim 31 wherein said radiation-curable composition is acrylate based.

33. The method of claim 14 wherein polymerization of said at least one polymerizable ingredient is subject to free radical initiation, and wherein said photoinitiator is a free radical generator.

34. The method of claim 33 wherein said radiation-curable composition is acrylate based.

35. The article of claim 27 wherein said elongate filler elements are of generally cylindrical form.

36. The article of claim 21 wherein said mass of the formulation has a thickness of at least about 20 mils.

37. The article of claim 27 wherein said applied mass of formulation has a thickness of at least about 20 mils, and wherein substantial curing of said formulation is effected in said step (c) to a depth, in the thickness direction of said mass, of at least about 20 mils.

38. The method of claim 32 wherein said formulation additionally includes a catalytic amount of free radical-generating active oxygen thermal initiator.

39. The method of claim 38 wherein said curing of said formulation is effected at a temperature below the temperature at which said active oxygen thermal initiator has a half-life of about one hour.

40. The method of claim 39 wherein said active oxygen thermal initiator has a half-life of about one hour at temperatures not exceeding about 125° C.

41. The method of claim 38 wherein said mass of formulation has a thickness substantially in excess of 20 mils, and wherein substantial curing of said formulation is effected in said step (c) to a depth, in the thickness direction, substantially in excess of 20 mils.

42. The article of claim 28 wherein said at least one substrate is comprised of at least two adjacent, mutually spaced surfaces, and wherein said mass of formulation is applied to said two adjacent surfaces and said solid deposit forms a seal therebetween.

43. The article of claim 28 wherein said composition is so composed as to cure to a compressible, adhesive solid, and wherein said mass of formulation is applied to said at least one substrate in such a configuration as to enable said solid deposit to function as a gasket.

44. The article of claim 28 wherein said at least one substrate is comprised of at least two adjacent electrically conductive elements, and wherein said mass of formulation is applied to said at least two conductive elements and said deposit functions as a solder joint therebetween.

45. The formulation of claim 31 wherein said formulation additionally includes a catalytic amount of a free radical-generating active oxygen thermal initiator having a half-life of about one hour at temperatures not exceeding about 125° C.

46. The formulation of claim 35 wherein said catalytic amount is about 0.5 to 3.0 percent based upon the weight of said at least one polymerizable ingredient.

* * * * *

UNITED STATES PATENT AND TRADEMARK OFFICE
CERTIFICATE OF CORRECTION

PATENT NO. : 6,169,125 B1
DATED : January 2, 2001
INVENTOR(S) : John R. Arnold

It is certified that error appears in the above-identified patent and that said Letters Patent is hereby corrected as shown below:

Column 11, claim 4,
Line 56, delete "A";

Column 14, claim 38,
Line 12, delete "32" and substitute -- 20 --;

Column 14, claims 42, 43, and 44,
Lines 28, 33, and 39, respectively, delete "28" and substitute -- 27 --;

Column 14, claim 46,
Line 49, delete "35" and substitute -- 45 --.

Signed and Sealed this

Thirteenth Day of November, 2001

Attest:

NICHOLAS P. GODICI
*Attesting Officer*   *Acting Director of the United States Patent and Trademark Office*